(12) United States Patent
Ban et al.

(10) Patent No.: US 6,338,912 B1
(45) Date of Patent: Jan. 15, 2002

(54) FUEL CELL SYSTEM HAVING COMMON SCROLL TYPE COMPRESSOR AND REGENERATOR

(75) Inventors: Takashi Ban; Ryuta Kawaguchi; Masahiko Kimbara; Hidehito Kubo, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/431,986

(22) Filed: Nov. 2, 1999

(30) Foreign Application Priority Data

Nov. 18, 1998 (JP) .......................................... 10-327987

(51) Int. Cl.[7] ................................................ H01M 2/00
(52) U.S. Cl. ............................. 429/34; 429/12; 429/13; 429/14; 429/17; 429/19; 429/22
(58) Field of Search ............................ 429/12, 13, 14, 429/17, 19, 22

(56) References Cited

U.S. PATENT DOCUMENTS 5,247,795 A * 9/1993 McCullough .............. 60/605.1
5,434,016 A   7/1995 Benz et al.
5,645,950 A   7/1997 Benz et al.

FOREIGN PATENT DOCUMENTS

| JP | 7-14599 | 1/1995 |
|---|---|---|
| JP | 8-61264 | 3/1996 |
| JP | 9-250463 | 9/1997 |
| JP | 9-250474 | 9/1997 |

* cited by examiner

Primary Examiner—Carol Chaney
Assistant Examiner—Dah-Wei D. Yuan
(74) Attorney, Agent, or Firm—Morgan & Finnegan, LLP

(57) ABSTRACT

A fuel cell system includes a fuel cell, a motor, a scroll type compressor connected to the air feeding pipe of the fuel cell and a scroll type regenerator connected to the air exhaust pipe of the fuel cell. The compressor and the regenerator share a movable scroll which is operatively coupled to the motor output shaft. The movable scroll has a common base plate, a first scrolling wall arranged on one side of the common base plate to engage with a scrolling wall of a stationary scroll of the compressor, and a second scrolling wall arranged on the other side of the common base plate to engage with a scrolling wall of a stationary scroll of the regenerator. This arrangement simplifies the structure and facilitates power assistance to the compressor.

8 Claims, 5 Drawing Sheets

FUEL CELL SYSTEM HAVING COMMON SCROLL TYPE COMPRESSOR AND REGENERATOR

BACKGROUND OF THE INVENTION

1. Field of the Invention

The present invention relates to a fuel cell system which can recover pressure energy from an exhaust gas by expanding the exhaust gas in a regenerator after oxygen has been consumed in a fuel cell and use the recovered energy to assist in driving a compressor.

2. Description of the Related Art

Japanese Unexamined Patent Publication (Kokai) No. 7-14599 discloses a fuel cell system. FIG. 5 in the attached drawings shows such a prior art, wherein air sucked through an air feeding conduit 60 is supplied to a fuel cell 63 after being pressurized to a certain pressure by a compressor 62 driven by an electric motor 61. Oxygen is consumed from the supplied air in the fuel cell and an exhaust gas is discharged from the system to the atmosphere after being expanded in an expander 65 coupled to the compressor 62 and the motor 61 with a common shaft 64.

The produced water contained in the exhaust gas is separated by liquid separators 67 and 68 provided in an air discharging conduit 66, and collected into an open type reservoir 69, from which the stored water is fed to a jet nozzle 71 by a pump 70 and injected into the air feeding conduct 60 for the purpose of humidifying the process air.

That is, as stated above, it is very efficient for the produced water contained in the exhaust gas from the fuel cell 63 to be separated and collected for the purpose of humidifying the process air. Such water is usable not only for maintaining the proton conductivity of a cation exchange membrane in the fuel cell 63 but also for cooling and lubricating the compressor 62. In this respect, a scroll type compressor particularly could benefit from the use of such water, and there have been many proposals for improving the scroll type compressors or expanders.

However, when the residual (pressure) energy remaining in the exhaust gas from the fuel cell is converted to a mechanical energy by the regenerator (expander) and fed to the compressor via the common shaft, a difference is generated between the pressure of the discharge air from the compressor and the pressure of the exhaust gas introduced into the regenerator due to a pressure loss in the fuel cell, whereby the exhaust gas is sometimes made to expand in the regenerator to have a subatmospheric pressure, resulting in an undesirable energy consumption.

SUMMARY OF THE INVENTION

An object of the present invention is to solve the above-mentioned problem in the prior art while maintaining the merits of a scroll type compressor and a scroll type regenerator, by recovering the residual energy from the exhaust gas of a fuel cell to assist the compressor without useless power consumption in the regenerator as well as to further improve in the mechanical efficiency by simplifying the structure of the compressor and the regenerator of a scroll type.

A fuel cell system, according to the present invention, to solve the above problems, comprises: a fuel cell having an air feeding passage and a gas exhaust passage; a scroll type compressor arranged in the air feeding passage, said compressor including a stationary scroll and a movable scroll; a scroll type regenerator arranged in the gas exhaust passage, said regenerator including a stationary scroll and a movable scroll; a motor having an output shaft; the movable scroll of the compressor being integrally formed with the movable scroll of the regenerator such that the movable scroll of the compressor and the movable scroll of the regenerator have a common base plate, a first scrolling wall extending on one side of the common base plate and a second scrolling wall extending on the opposite side of the common base plate; the first scrolling wall being engaged with the stationary scroll of the compressor, the second scrolling wall being engaged with the stationary scroll of the regenerator; and the common base plate being operatively coupled to the output shaft of the motor.

Since the compressor and the regenerator, both of which are of a scroll type, are skillfully combined with each other via the common movable scroll coupled to the motor output shaft, an air feeding mechanism having a strict simplicity and an excellent mechanical efficiency as required particularly for a vehicle fuel cell system, can be obtained. If the pressure ratio of the regenerator is set to a value capable of sufficiently compensating for a pressure loss of the supplied air generated in the fuel cell, it is possible to prevent the exhaust gas introduced into the regenerator excessively expanding to a subatmospheric pressure; in other words, the transmission of negative torque due to the rotation of the regenerator to the motor output shaft is completely avoidable to facilitate the effective assistance to the compressor.

If the system is adapted so that the water separated from the exhaust gas is pumped to the injector of the scroll type compressor, it is possible not only to humidify the supplied air but also to suitably cool and lubricate the compressor itself. Also, if both the compressor and the regenerator are arranged in phase so that peaks of torque variation thereof generally coincide with each other, the power transmission between the compressor and the regenerator is further enhanced. Moreover, if the number of turns of the scrolling walls formed in the scroll of the compressor and the regenerator is adjustable, it is possible to easily select a suitable relative pressure ratio between the both in correspondence to the pressure loss within the fuel cell.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
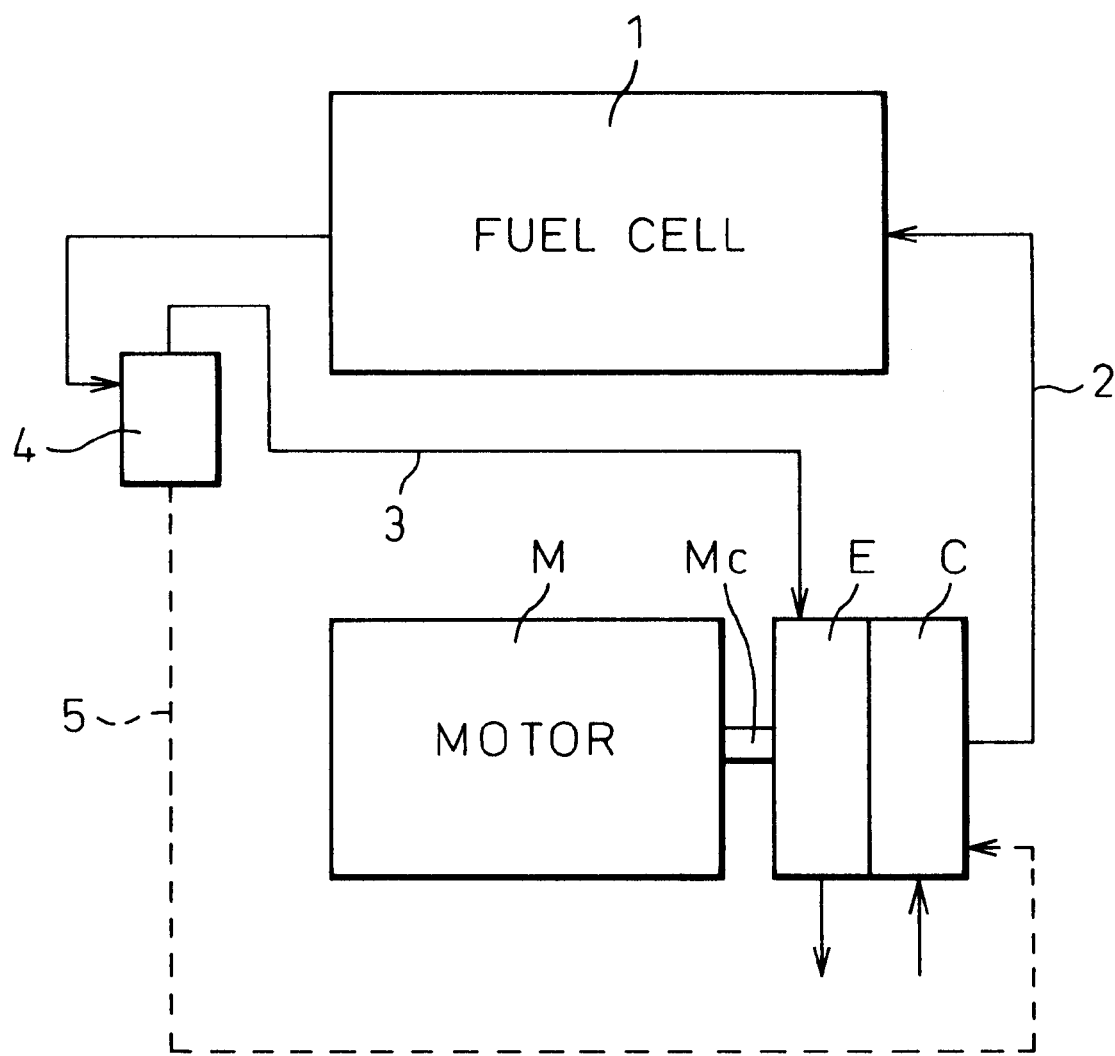
FIG. 1 is a diagrammatic view of a fuel cell system according to the embodiment of the present invention.

A fuel cell system will now be briefly described with reference to FIG. 1 schematically illustrating the same.

A fuel cell 1, as is already known, is formed of a layer of electrolyte, as if a flat plate layer, and layers of an anode and a cathode arranged on either side of the electrolyte. Process air is fed to the fuel cell 1 from a compressor C through an air feeding pipe 2, passes through an anode space in the fuel cell 1 (not shown), and is then discharged from the fuel cell 1 via an air exhaust pipe 3. Gas rich in hydrogen or modified hydrogen is fed to the cathode space in the fuel cell 1 (not shown) via a fuel feeding path. When hydrogen reacts in the fuel cell 1 with oxygen contained in the process air, water and heat of reaction are produced as well as electric energy, and therefore an exhaust gas containing water vapor is exhausted from the fuel cell 1.

The exhaust gas is introduced into a regenerator (expander) E after moisture has been removed in a water separation tank 4 provided in the air exhaust pipe 3 so that residual pressure energy remaining in the exhaust gas is recovered. The regenerator E is operatively coupled to an output shaft Mc of a motor M along with the above-mentioned compressor C, wherein both the compressor C and the regenerator E are of a scroll type in the present invention.

Figure 2:
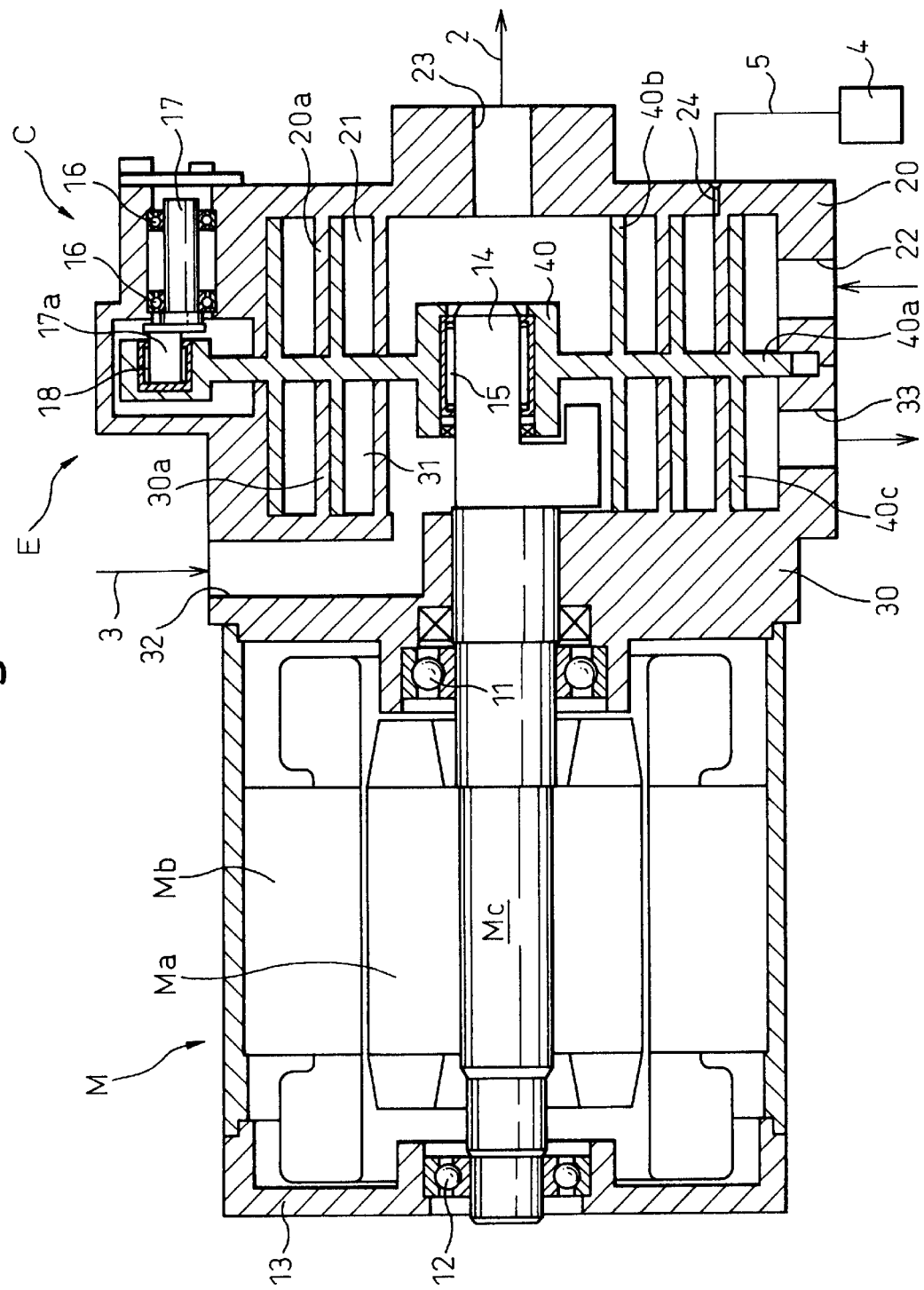
FIG. 2 is a cross sectional view of the compressor and the regenerator used for the fuel cell system of FIG. 1.

The present invention will now be described in detail with reference to FIG. 2.

In this drawing, the motor M has a housing, a rotor Ma, a stator Mb and an output shaft Mc, and the motor output shaft Mc is supported by a stationary scroll 30 of the regenerator E and an end cap 13 of the motor M, which are parts of the housing, by bearings 11 and 12. A movable scroll 40, which is common to the compressor C and the regenerator E, is assembled for rotation via a bearing 15 to a crank section 14 of the output shaft Mc arranged in parallel to an axis of the motor output shaft Mc with an eccentricity by a predetermined amount. The movable scroll 40 has a common base plate 40a, a first scrolling wall 40b provided on one side (righthand side in the drawing) of the common base plate 40a for the compressor C, and a second scrolling wall 40c provided on the other side (lefthand side in the drawing) of the common base plate 40a for the regenerator. The first scrolling wall 40b and the second scrolling wall 40c are integrally formed with the common base plate 40a. When the motor output shaft Mc rotates, the movable scroll 40 is subjected to an orbital motion along a circular locus having a center at the axis of the output shaft Mc and a radius equal to the eccentric distance. The movable scroll 40 is inhibited from rotating about its own axis by a self rotation preventing mechanism, described later, so that the orbital rotation about the center of the motor output shaft Mc is solely allowed.

A stationary scroll 20 of the compressor C and a stationary scroll 30 of the regenerator E are shaped like a housing adapted to accommodate the movable scroll 40 therein. On the inner surfaces of the stationary scrolls 20 and 30, stationary scrolling walls 20a and 30a are respectively provided, so that movable scrolling walls 40b and 40c subjected to an orbital motion are meshed with the stationary scrolling walls 20a and 30a to define a working chamber 21 between the scrolling walls 20a and 40b for the compressor C and another working chamber 31 between the scrolling walls 30a and 40c for the regenerator E. These two working chambers 21 and 31 are isolated from each other to inhibit the communication therebetween by the base plate 40a of the movable scroll 40 which is sealingly arranged between the assembled stationary scrolls 20 and 30. Note that an intake port 22 and a discharge port 23 are provided in the stationary scroll 20 of the compressor C, while an introduction port 32 and an exhaust port 33 are provided in the stationary scroll 30 of the regenerator E, so that ports are in communication with the outer circumferential region and the central region of the working chambers 21 and 31, respectively, at predetermined phases.

Next, the self rotation preventing mechanism will be described. A plurality of auxiliary crank shafts 17 are arranged around the motor output shaft Mc, each having an auxiliary crank section 17a with an eccentricity equal to that of the crank section 14 and supported for rotation by bearings 16, so that the respective auxiliary crank section 17a supports the movable scroll 40 via a bearing 18.

In this regard, the self rotation preventing mechanism used in the scroll type compressor C and regenerator E according to the present invention should not be limited to the above-mentioned arrangement.

Figure 3:
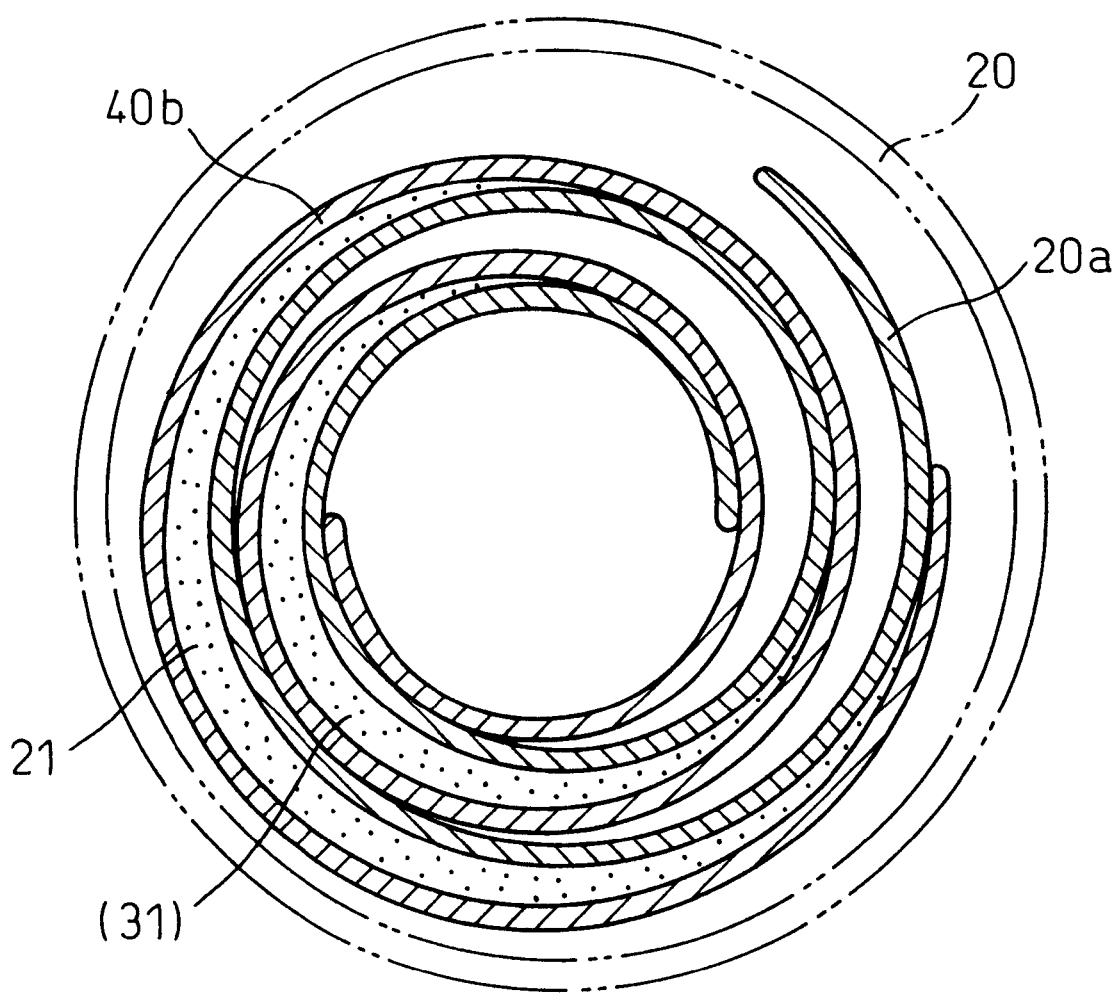
FIG. 3 is a view illustrating a working chamber defined by stationary and movable scrolls of the compressor, at an instant when intake air is just enclosed in the working chamber.
Figure 4:
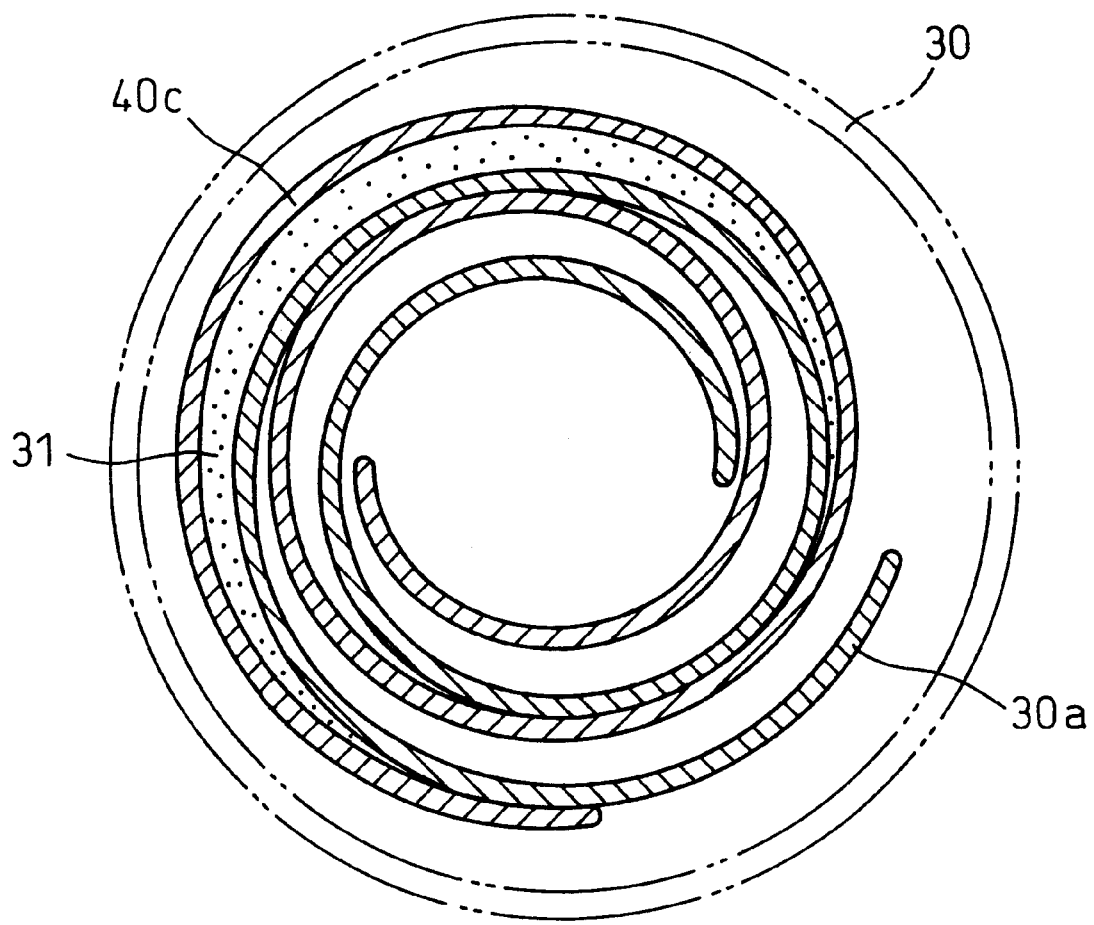
FIG. 4 is a view illustrating a working chamber defined by stationary and movable scrolls of the regenerator, at an instant just before the same is in communication with the discharge port after being expanded due to the expansion of the exhaust gas.
Figure 5:
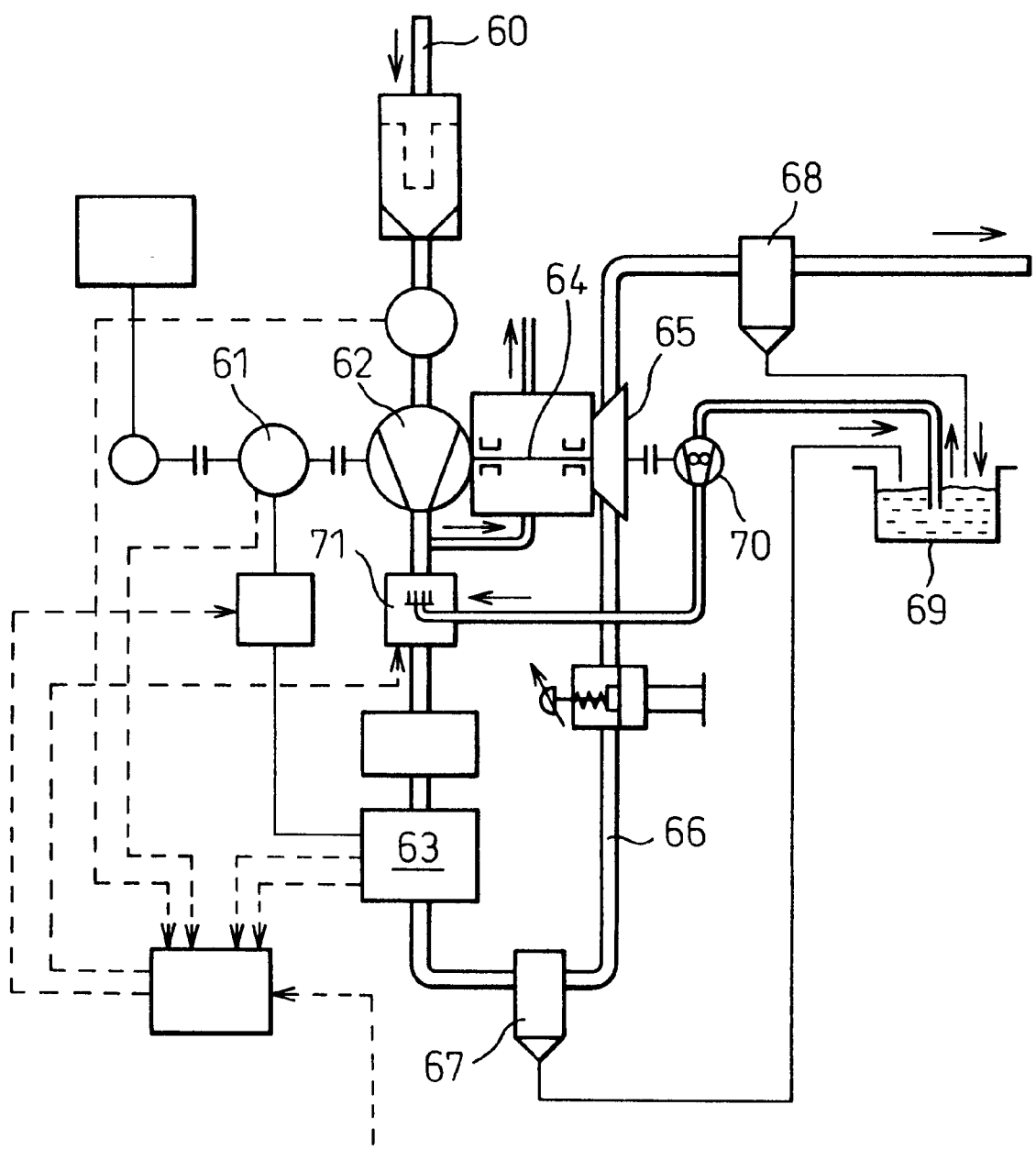
FIG. 5 is a diagrammatic view illustrating an arrangement of a prior art fuel cell system.

The most characteristic structure of the present invention will be described with reference to FIGS. 3 and 4. FIG. 3 illustrates the working chamber 21 defined between the movable scrolling wall 40b and the stationary scrolling wall 20b meshed with each other due to the orbital motion of the movable scrolling wall 40b within the compressor C at an instant when intake air is just enclosed therein; i.e., a part of the working chamber 21 in the state having the outermost chamber volume, and another part of the working chamber 21 in the state having the innermost chamber volume which has gradually been reduced and reached a point directly before the working chamber 21 is in communication with the discharge port 23. FIG. 4 illustrates the movable scrolling wall 40c and the stationary scrolling wall 30a constituting the working chamber 31 of the regenerator E wherein each of the scrolling walls 40c and 30a has a number of turns less than that of the compressor C by ¼ turn so that a pressure ratio (expansion ratio) of the regenerator E relative to the compressor C is properly reduced to compensate for the pressure loss in the fuel cell 1. Especially, FIG. 4 illustrates the working chamber 31 in the state directly before the exhaust gas is released through the exhaust port 33 while the volume thereof gradually increases due to the expansion of the introduced exhaust gas. The difference between the outermost chamber volume of the compressor C and the outermost chamber volume of the regenerator E will be apparent from the comparison of FIG. 3 with FIG. 4. Also, as shown in FIG. 3, the state at which the volume of the working chamber 21 is minimized just before the discharge of air; i.e., the timing at which the torque variation of the compressor C reaches a peak, substantially coincides in phase with the state at which the introduced exhaust gas is enclosed in the working chamber 31 having the innermost chamber volume, i.e., the timing at which the torque variation of the regenerator E reaches a peak, whereby the power transmission between the regenerator E and the compressor C is further facilitated.

Accordingly, the process air pressurized to a predetermined pressure by the action of the compressor C driven by the motor M is supplied to the anode space of the fuel cell 1 through the air feeding pipe 2 and oxygen contained in the process air reacts with hydrogen supplied to the cathode space in a similar manner, so water and heat as well as electric energy are generated by the reaction. Then, exhaust gas rich in water vapor resulted from the reaction is discharged from the fuel cell 1. After the moisture has been removed from the exhaust gas at the water-separation tank 4 provided in the air exhaust pipe 3, the exhaust gas is introduced into the regenerator E for recovering pressure energy remaining in the exhaust gas, while the separated and stored water is supplied to a water injector 24 of the compressor C via the water feeding path 5 for humidifying the process air as well as cooling and lubricating the compressor C.

As described above, the arrangement wherein the compressor C and the regenerator E, both of which are of a scroll type, are combined with each other, by sharing the common movable scroll 40, that is, a series of driving mechanisms consisting of an air feeding mechanism including the motor M and the power assist mechanism, has an overall axial length as short as possible, which provides a simplicity in structure suitable for a vehicle fuel cell system. Also, such an arrangement is particularly excellent because the compressor C has a high aptitude for being cooled and lubricated with water. A pressure loss of the process air occurring in the fuel cell 1 is, however, never negligible when the power assist for the compressor C is carried out by using the regenerator E disposed on the same shaft. That is, if such a pressure loss was not taken into account when a pressure ratio is selected in the compressor C and the regenerator E, the exhaust gas introduced into the regenerator E might excessively expand to a subatmospheric pressure and consume an additional power. Contrarily, according to the present invention, as apparent from the comparison between FIGS. 3 and 4, the pressure ratio (expansion ratio) of the regenerator E is determined to be smaller than that of the compressor C by an amount corresponding to a pressure loss of the fuel cell 1. Therefore, it is possible to completely avoid the excessive expansion of the exhaust gas to a subatmospheric pressure, in other words, the inconvenience in that the rotation of the regenerator E transmits a negative torque to the motor output shaft Mc. Also, as shown in FIG. 3, the movable scrolls of the compressor C and the regenerator E are arranged in phase so that an instant just before the discharge of air from the working chamber 21 and the torque variation of the compressor C reaches a peak generally coincides with an instant at which the introduced exhaust gas is enclosed in the working chamber 31 and also the torque variation of the regenerator E reaches a peak, whereby the power transmission between the both is further facilitated.

As described in detail above, according to the present invention, since the compressor and the regenerator, both of which are of a scroll type, are integrally coupled to each other while using a common movable scroll, an overall axial length including a motor becomes extremely short, the structure is significantly simplified, and axial thrusts applied on the movable scroll are reasonably offset to each other. Particularly, in the arrangement where the pressure ratio of the regenerator is selected to compensate for the pressure loss of process air in the fuel cell, the regenerator never transmits negative torque to the motor output shaft, whereby the current for driving the motor is effectively decreased. In the arrangement where water separated from exhaust gas is directly supplied to the injector of the compressor, it is possible not only to humidify the process air but also to cool and lubricate the compressor. Further, in the arrangement where peaks of torque variation of the compressor and the regenerator generally coincide with each other, it is possible to assist the compressor with a higher efficiency.

What is claimed is:

1. A fuel cell system comprising:
   a fuel cell having an air feeding passage and a gas exhaust passage;
   a scroll compressor arranged in the air feeding passage, said compressor including a stationary scroll and a movable scroll;
   a scroll regenerator arranged in the gas exhaust passage, said regenerator including a stationary scroll and a movable scroll;
   a motor having an output shaft;
   the movable scroll of the compressor being integrally formed with the movable scroll of the regenerator such that the movable scroll of the compressor and the movable scroll of the regenerator have a common base plate, a first scrolling wall extending on one side of the common base plate and a second scrolling wall extending on the opposite side of the common base plate;
   the first scrolling wall being engaged with the stationary scroll of the compressor, the second scrolling wall being engaged with the stationary scroll of the regenerator; and
   the common base plate being operatively coupled to the output shaft of the motor.

2. A fuel cell system according to claim 1, wherein a pressure ratio of the regenerator is smaller than that of the compressor by an amount corresponding to a pressure loss of the gas across the fuel cell.

3. A fuel cell system according to claim 1, further comprising a water separation tank provided in the gas exhaust passage and having a water storage portion, a water injecting device provided in the compressor, and a water feeding passage interconnecting the water storage portion and the water injecting device.

4. A fuel cell system according to claim 1, wherein the movable scroll of the compressor and the movable scroll of the regenerator are arranged so that a peak timing of torque variation of the compressor is in phase with a peak timing of the torque variation of the regenerator.

5. A fuel cell system according to claim 1, wherein a relative pressure ratio of the compressor to the regenerator is controlled by the number of turns of scrolling wall of the movable scrolls of the compressor and the regenerator.

6. A fuel cell system according to claim 1, wherein said motor comprises a housing, a stator and a rotor to which said output shaft is coupled, said stationary scroll of the compressor and said stationary scroll of the regenerator being secured by the housing.

7. A fuel cell system according to claim 1, wherein the common base plate of the movable scrolls of the compressor and the regenerator is coupled to an end of the output shaft of the motor via an eccentric shaft member and a bearing.

8. A fuel cell system according to claim 1, further comprising a self rotation preventing mechanism for the common base plate of the movable scrolls of the compressor and the regenerator.

* * * * *